United States Patent
Yoshioka et al.

(10) Patent No.: US 7,238,016 B2
(45) Date of Patent: Jul. 3, 2007

(54) INJECTION MOLDING MACHINE

(75) Inventors: Mitsushi Yoshioka, Yamanashi (JP);
Nobuaki Hashimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 344 days.

(21) Appl. No.: 10/978,377

(22) Filed: Nov. 2, 2004

(65) Prior Publication Data

US 2005/0100630 A1    May 12, 2005

(30) Foreign Application Priority Data

Nov. 11, 2003  (JP)  ............... 2003-381108

(51) Int. Cl.
*B29C 45/84* (2006.01)
(52) U.S. Cl. ............... 425/151; 425/567; 425/574
(58) Field of Classification Search ........... 425/151, 425/567, 574
See application file for complete search history.

(56) References Cited

U.S. PATENT DOCUMENTS

| | | | | |
|---|---|---|---|---|
| 3,454,991 A | * | 7/1969 | Rees | ............... 425/151 |
| 5,328,346 A | * | 7/1994 | Kodric | ............... 100/258 A |
| 5,538,415 A | | 7/1996 | Reinhart et al. | |
| 6,113,383 A | | 9/2000 | Urbanek et al. | |

FOREIGN PATENT DOCUMENTS

| | | |
|---|---|---|
| DE | 8401998 | 1/1986 |
| EP | 0850129 B1 | 7/1998 |
| JP | 05-309694 | 11/1993 |
| JP | 06-134808 | 5/1994 |
| JP | 07-232363 | 9/1995 |
| JP | 2000-117791 | 4/2000 |
| JP | 2003-289069 | 10/2000 |
| JP | 2003-011162 | 1/2003 |
| JP | 2003-025378 | 1/2003 |

OTHER PUBLICATIONS

Notice of Reasons for Rejection (Office Action) mailed Nov. 1, 2005 in corresponding JP Patent Application No. 2003-381108.
EP Search Report for corresponding EP Application No. 04256830.. 3-1253 mailed Feb. 3, 2005.

* cited by examiner

*Primary Examiner*—Tim Heitbrink
(74) *Attorney, Agent, or Firm*—Staas & Halsey LLP

(57) ABSTRACT

A connecting member is formed by an upper plate portion and a side plate portion. One end of the upper plate portion is fixed to a fixed platen of an injection molding machine, and a lower end of the side plate portion is fixed to a base frame to which the fixed platen is fixed. This connecting member prevents the fixed platen from being tilted when a nozzle touch force is applied from an injection apparatus.

11 Claims, 5 Drawing Sheets

INJECTION MOLDING MACHINE

BACKGROUND OF THE INVENTION

1. Field of the Invention

The present invention relates to an injection molding machine and, more particularly, to an injection molding machine in which a tilt of a fixed platen caused by a nozzle touch force from an injection apparatus is prevented.

2. Description of the Related Art

In an injection molding machine, a fixed-side mold is installed to a fixed platen fixed to a base frame of the injection molding machine, and a movable-side mold is installed to a movable platen which moves longitudinally with respect to the fixed platen, by which the molds are closed by advancing the movable platen and are clamped. Also, an injection nozzle is pressed on a sprue bush of the fixed-side mold from the side opposite to the movable platen of the fixed platen by advancing an injection apparatus to provide a nozzle touch force, by which molten resin is injected into the clamped molds by advancing an injection screw.

The lower end portion of the fixed platen is fixed to the base frame, and the nozzle touch force from the injection molding is applied to the central portion of the fixed platen as described above. Therefore, the fixed platen tends to be tilted to the movable platen side by moment caused by the nozzle touch force. To solve this problem, Japanese Patent Application Laid-Open No. 2000-289069 discloses an injection molding machine in which a rib is provided on the fixed platen at a lower part of the surface on the injection mechanism side, and the rib is fixed to the base frame, by which the tilt of the fixed platen is prevented.

Also, Japanese Patent Application Laid-Open No. 2003-25378 discloses a method in which extensions projecting to the injection apparatus side are provided on the fixed platen at both sides of a lower part thereof, and the extensions are fixed to the base frame, by which the tilt of the fixed platen is prevented.

However, even if the tilt of the fixed platen is prevented by providing the rib (or the extensions) at the lower part of the fixed platen and by fixing the rib to the base frame, the portion in which the nozzle touch force acts with respect to the fixed platen is the center of a locating hole provided in the center of the fixed platen, that is, a portion above the rib, so that it is difficult to prevent the tilt of the fixed platen caused by the nozzle touch force.

Moreover, in a small-size injection molding machine, there is sometimes no room for providing a rib or the like. extending to the injection mechanism side at a lower part (part on the base frame side) of the fixed platen because the whole of the injection molding machine is constructed so as to be compact.

SUMMARY OF THE INVENTION

The present invention relates to an injection molding machine having a fixed platen fixed on a base frame and an injection apparatus which is disposed on the base frame so as to be opposed to the fixed platen to advance and retract a cylinder for supplying a molding material.

A first mode of this injection molding machine includes a connecting member one end of which is fixed to the fixed platen at a portion above a locating hole and the other end of which is fixed to the base frame on the anti-operation side on the injection apparatus side.

The injection molding machine of this mode can further adopt the following modes.

An upper part of the connecting member which is fixed to the fixed platen is of a plate shape, and is arranged so as to cover the cylinder.

The connecting member consists of an upper plate portion one end of which is fixed to the fixed platen and a side plate portion one end of which is fixed to the base frame, and the upper and side plate portions are arranged so as to cover the upside and one side of the cylinder.

The upper plate portion and the side plate portion are formed integrally, and a transparent cover is provided between an end portion of the upper plate portion on the side opposite to the side plate portion and the base frame, whereby both sides and upside of the cylinder are covered with the side plate portion, the cover, and the upper plate portion.

The injection molding machine further includes a support member for connecting and supporting an upper part of the connecting member and a part of the base frame on the operation side on the injection apparatus side.

Also, a second mode of this injection molding machine includes a connecting plate which is arranged above the cylinder, and one end portion of which is fixed to the fixed platen at a portion above a locating hole; and one or more rod-shaped support members for fixedly connecting the other end portion of the connecting plate to the base frame.

These support members can be provided on the base frame on the operation side and on the anti-operation side of the injection molding machine.

According to the present invention, the fixed platen the lower end portion of which is fixed to the base frame is also fixed to the base frame via a connecting member in the upper end portion. Therefore, even when a nozzle touch force is applied to the center of the fixed platen (center of locating hole), the fixed platen can surely be prevented from being tilted. Also, the upper plate portion of the connecting member can be used as a mount for mounting a product removing machine for removing a molded product from the mold. Also, since the region of the fixed platen on the side of the injection apparatus is covered by the connecting member, the connecting member functions as a cover for preventing the scattering of resin when resin scatters at the time of purging.

BRIEF DESCRIPTION OF THE DRAWINGS

These and other objects and features of the present invention will become more apparent from the following description of embodiments taken in connection with the accompanying drawings, in which.

DESCRIPTION OF THE EMBODIMENTS

Figure 1:
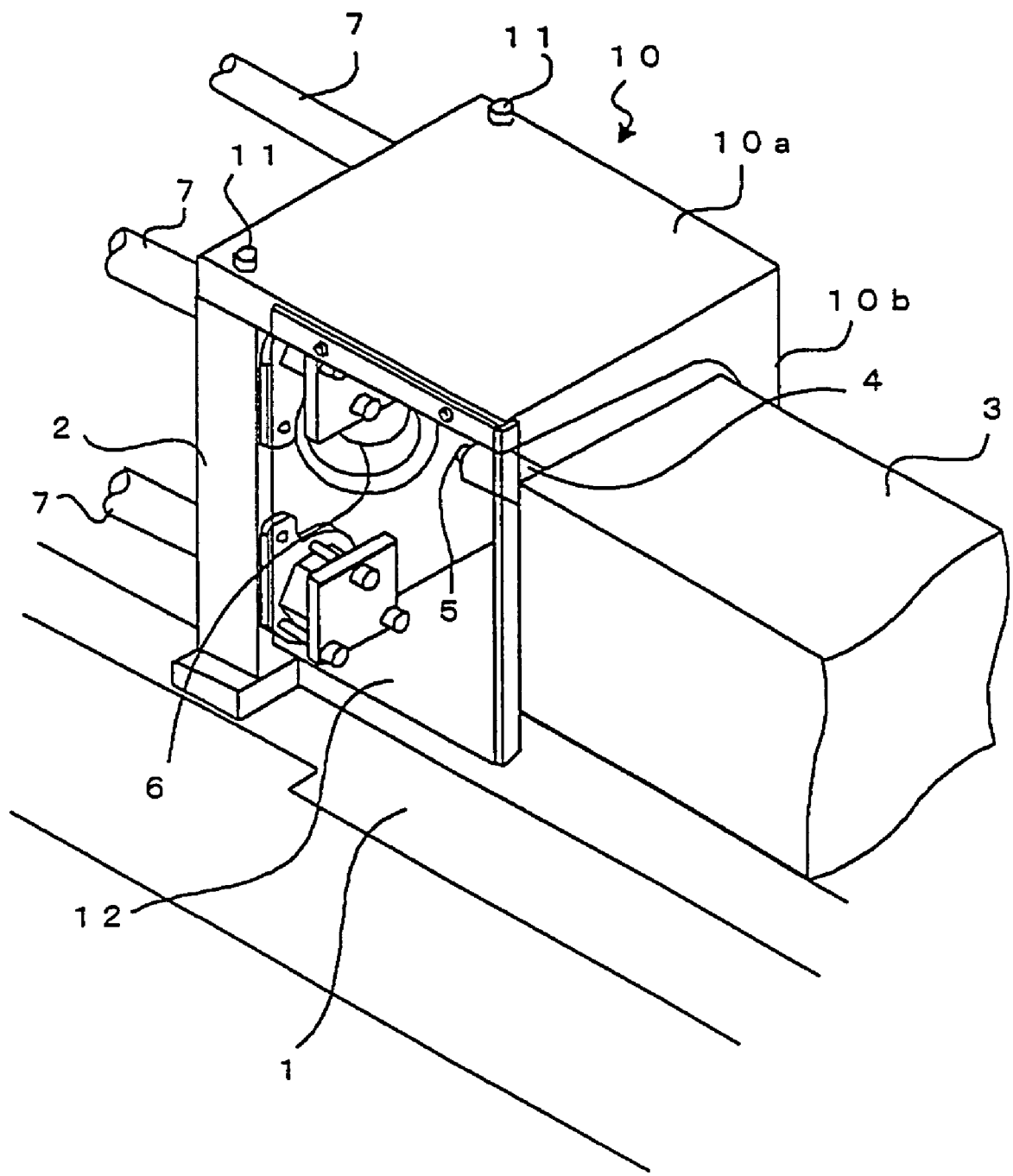
FIG. 1 is a perspective view of an essential portion of a first embodiment of an injection molding machine in accordance with the present invention, viewed from the operation side.

First, a first embodiment of an injection molding machine in accordance with the present invention will be described with reference to FIGS. 1 to 3.

A platen 2 of the injection molding machine is fixed to a base frame 1. The fixed platen 2 is connected with a rear platen (not shown) by a plurality of tie bars 7. To the fixed platen 2, a fixed-side mold (not shown) is fixed. Also, a movable-side mold is installed to a movable platen (not shown) that moves along the tie bars 7. The molds are opened/closed and clamped by the movement of the movable platen.

Further, an injection apparatus 3 is installed to the base frame 1 so as to be capable of advancing toward and retracting from the fixed platen 2, and is installed so as to be turnable around the vertical axis by a swivel joint. A nozzle 5 is provided at the tip end of a heating cylinder 4 provided on the injection apparatus 3. When the injection apparatus 3 advances, the nozzle 5 passes through a locating hole 6 provided in the fixed platen 2, and is pressed on a sprue bush of the fixed-side mold installed to the fixed platen 2, which gives a nozzle touch force to the fixed-side mold. This nozzle touches force acts to tilt and bring down the fixed platen 2 to which the fixed-side mold is installed. In this embodiment, therefore, there is provided a connecting member 10 one end of which is fixed to the upper end surface of the fixed platen 2 and the other end of which is fixed to the base frame 1 on the anti-operation side.

Figure 2:
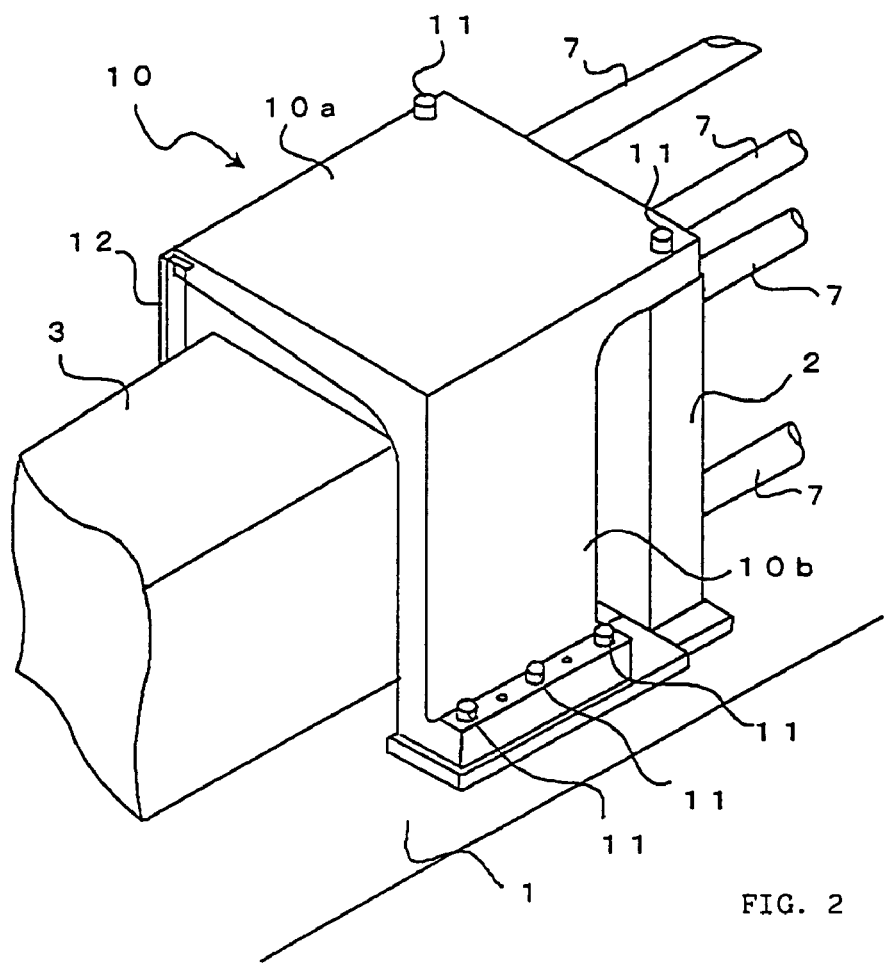
FIG. 2 is a perspective view of an essential portion of the injection molding machine shown in FIG. 1, viewed from the anti-operation side.
Figure 3:
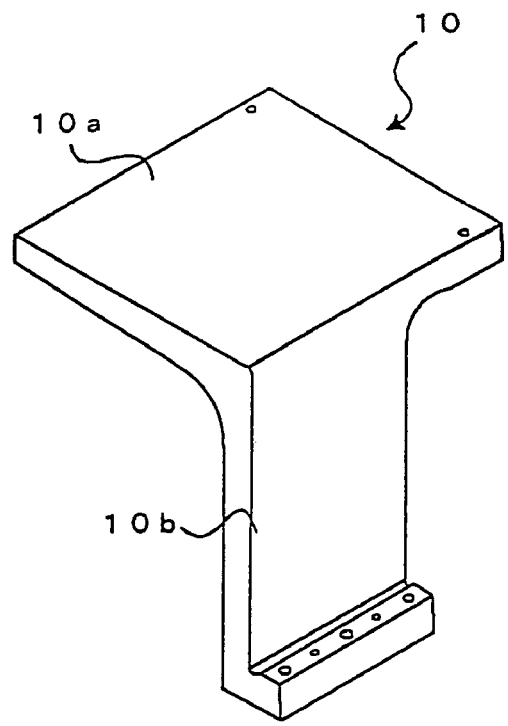
FIG. 3 is a perspective view of a connecting member for preventing a tilt of a fixed platen, which is used for the injection molding machine shown in FIG. 1.

As shown in FIG. 3, the connecting member 10 is formed of an upper plate portion 10a having a flat plane formed at the upper part and a side plate portion 10b integrally formed on one side of the upper plate portion 10a. As shown in FIGS. 1 and 2, one end of the upper plate portion 10a of the connecting member 10 is fixed to the upper surface of the fixed platen 2 with bolts 11 or the like, and the upper plate portion 10a is fixed so as to extend to the injection apparatus side.

The lower end of the side plate portion 10b is fixed to the base-frame 1 on the anti-operation side with bolts 11 or the like. As a result, the injection apparatus side of the fixed platen 2, that is, the region of the cylinder 4, is surrounded by the upper plate portion 10a and the side plate portion 10b of the connecting member 10. Also, as shown in FIG. 1, on the operation side, a transparent cover 12 is fixed to the side portion of the upper plate portion 10a of the connecting member 10 so as to surround the region of the cylinder 4. The cover 12 need not necessarily be provided, and may be installed when scattering resin is purged as described later.

Even if the injection apparatus 3 advances, and the nozzle 5 provided at the tip end of the cylinder 4 presses the sprue bush of the fixed-side mold fixed to the fixed platen 2, by which the set nozzle touch force is applied to the fixed-side mold, the lower end portion of the fixed platen 2 is fixed to the base frame 1 and the upper end portion thereof is fixed to the base frame 1 by the connecting member 10, so that the tilt of the fixed platen 2 can be prevented.

Moreover, since the connecting member 10 has a shape such as to cover the upside of the cylinder 4 and the side on the anti-operation side, resin is prevented from scattering to the upside and the side on the anti-operation side at the time of purging. On the other hand, as shown in FIG. 1, on the operation side, the cover 12 is installed, so that resin is prevented from scattering to the side.

Furthermore, since the upper surface of the upper plate portion 10a of the connecting member 10 of this embodiment is formed in a shape of a flat plane, the upper plate portion 10a can be used as a mount for mounting a product removing machine for removing a molded product from the mold.

Since the connecting member 10 is fixed to the upper end surface of the fixed platen 2 and the base frame 1 on the anti-operation side, it does not become a hindrance even when the injection apparatus 3 is turned at the time of the advancing and retracing operation of the injection apparatus 3 or the replacement of the nozzle and/or an injection screw.

Figure 4A:
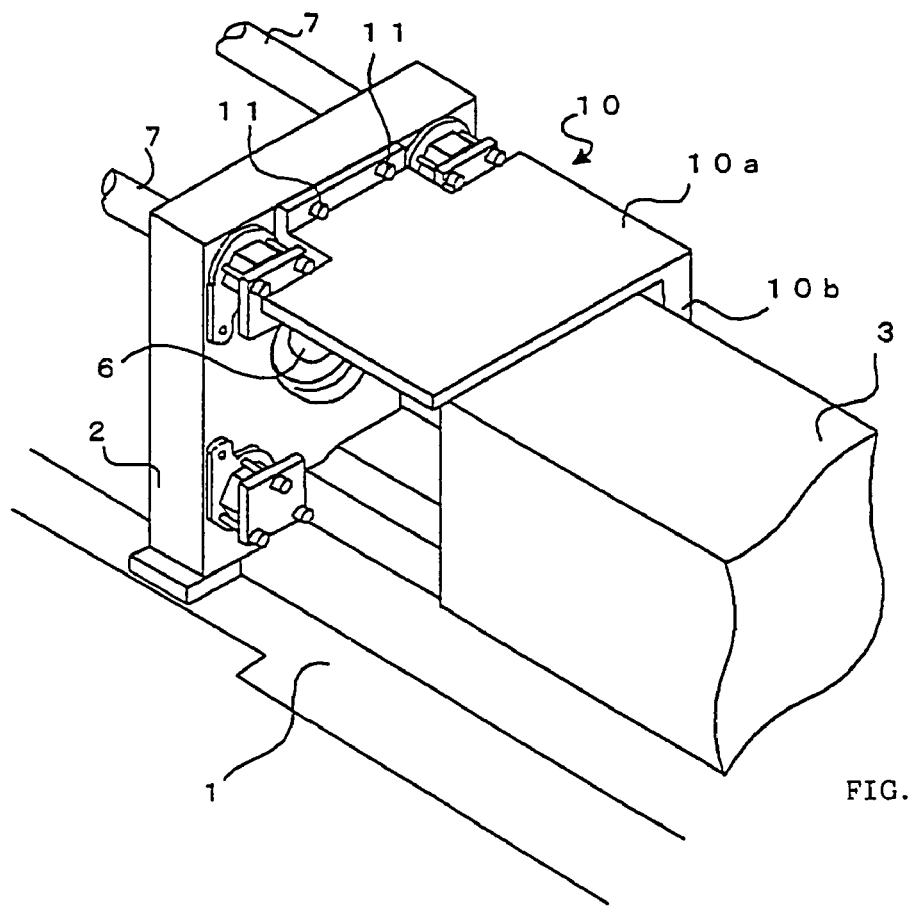
FIG. 4A is a perspective view of an essential portion of a second embodiment of an injection molding machine in accordance with the present invention, viewed from the operation side.

Next, a second embodiment of an injection molding machine in accordance with the present invention will be described with reference to FIGS. 4A and 4B.

This second embodiment is the same as the first embodiment shown in FIGS. 1 and 2 except for the installation of the connecting member to the fixed platen. In the second embodiment, an end portion of the upper plate portion 10a of the connecting member 10 is fixed to the side of the fixed platen 2 at a portion above the locating hole 6 provided in the fixed platen 2 with bolts 11 or the like. Other constructions are the same as those of the first embodiment. FIG. 4A shows a state in which the transparent cover 12 (refer to FIG. 1) for preventing the scattering of resin is removed.

Hereunder, modifications of the connecting member 10 shown in FIG. 3 will be explained with reference to FIGS. 5 to 7.

For the connecting member 10 shown in. FIG. 5, the upper plate portion 10a of the connecting member 10 shown in FIG. 3 is formed in a triangular shape. Specifically, the upper plate portion 10a is cut along a diagonal line connecting a corner point P on the side of installation to the fixed platen 2 and on the operation side to a corner point Q on the side opposite to the fixed platen 2 and on the anti-operation side, by which the triangular shape is formed. Other constructions are the same as those of the first embodiment.

Figure 4B:
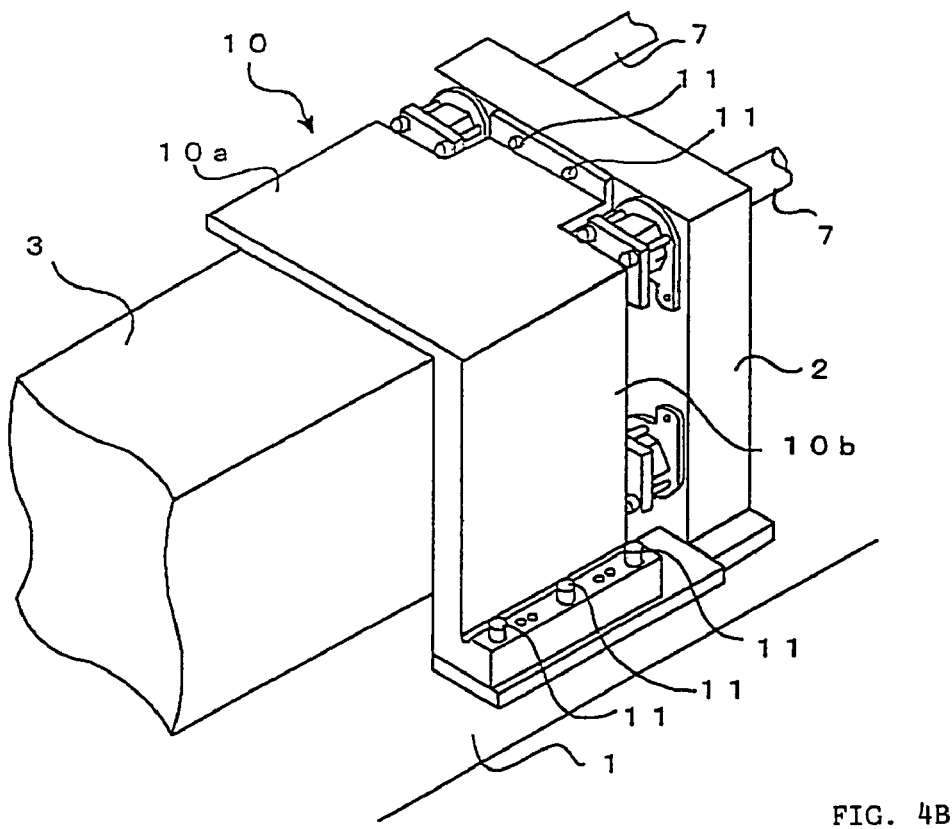
FIG. 4B is a perspective view of an essential portion of the injection molding machine shown in FIG. 4A, viewed from the anti-operation side.
Figure 5:
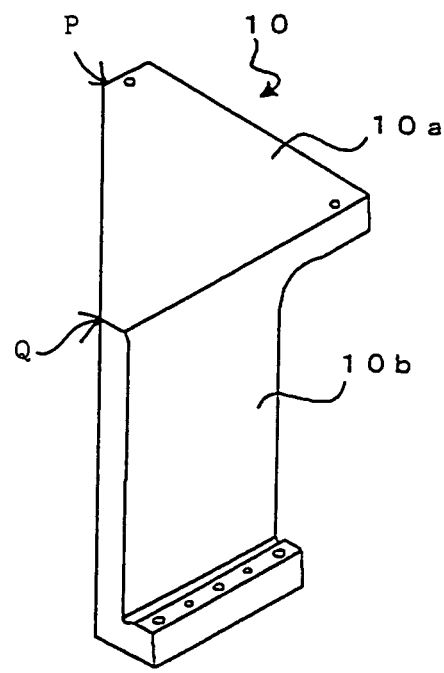
FIG. 5 is a perspective view showing a first modification of the connecting member shown in FIG. 3.

The connecting member 10 having the triangular upper plate portion 10a as shown in FIG. 5 may be fixed to the side of the fixed platen 2 at a portion above the locating hole 6 provided in the fixed platen 2 as shown in FIG. 4B (second embodiment).

Figure 6:
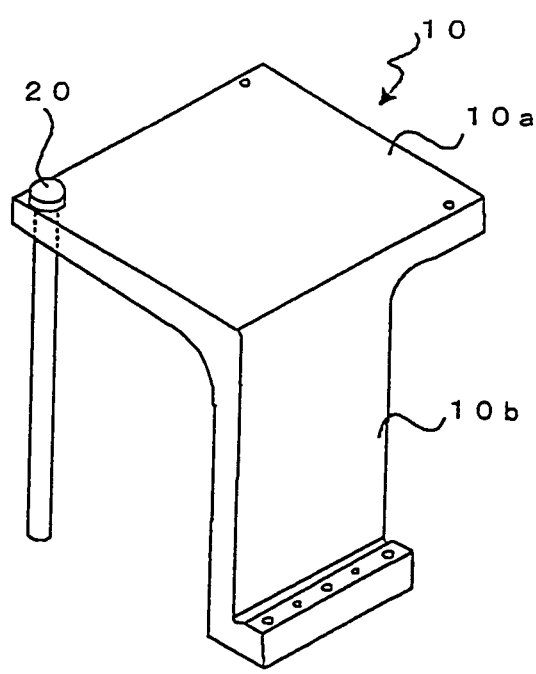
FIG. 6 is a perspective view showing a second modification of the connecting member shown in FIG. 3, in which the connecting member is fixed to a base plate by a support member.

Also, as shown in FIG. 6, a support member 20 such as a fixing bolt may be provided on the connecting member 10 at a position on the side opposite to the fixed platen and on the operation side. In this case, the fixed platen tilt preventive effect achieved by the connecting member 10 is increased. When the injection apparatus 3 is turned, the support member has only to be removed, so that maintenance is not so difficult to do.

Although the above-described connecting member 10 has a construction such that the upper plate portion 10a and the side plate portion 10b are formed integrally, the upper plate portion 10a and the side plate portion 10b need not necessarily be formed integrally. The connecting member 10 may be formed by connecting-two plate-shaped members.

Figure 7:
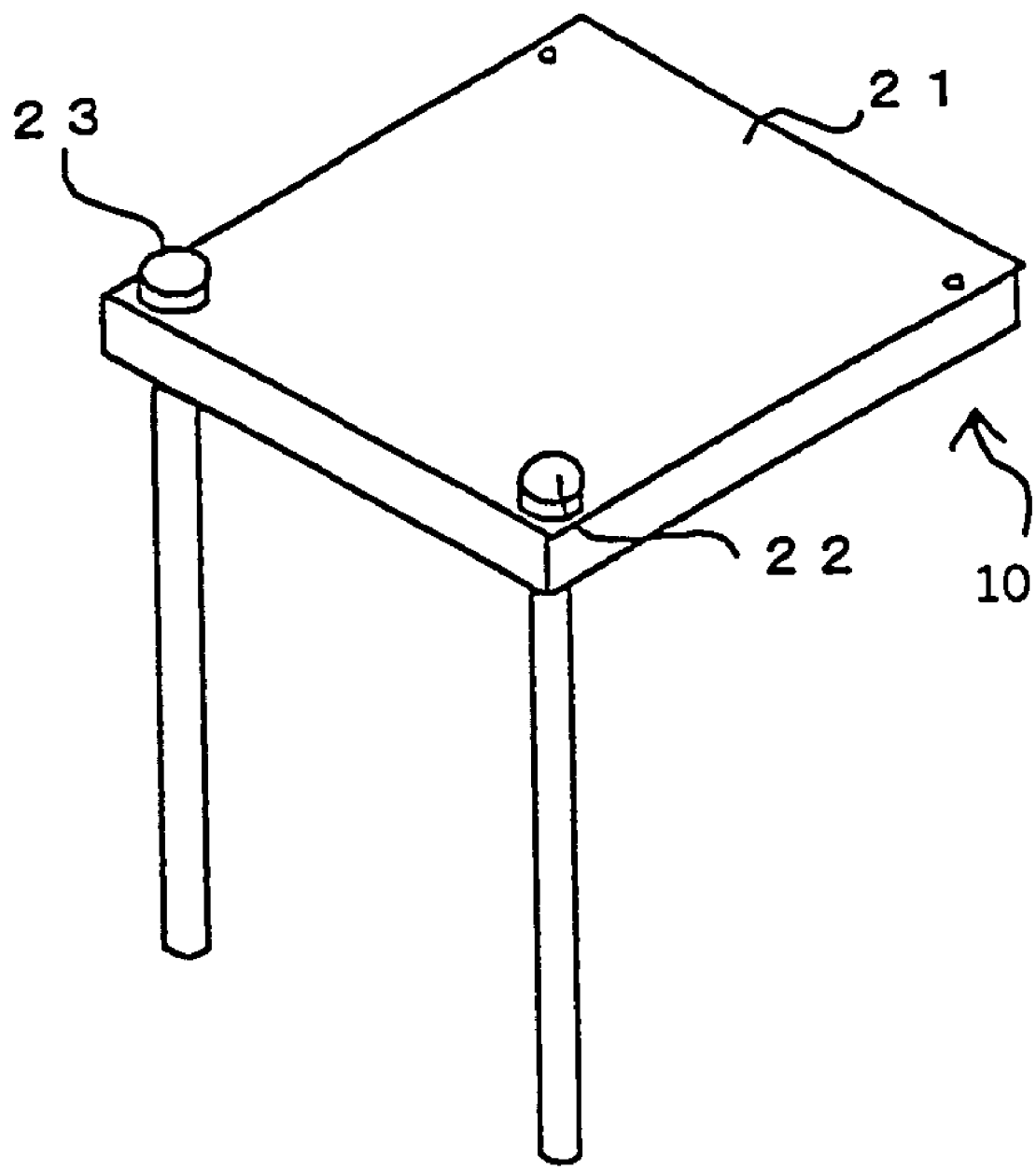
FIG. 7 is a perspective view showing a third modification of the connecting member shown in FIG. 3, in which the connecting member is made up of a connecting plate and a support member.

Further, as shown in FIG. 7, the connecting member 10 may be formed by one connecting plate 21 and one support member 22 such as a fixing bolt provided at one end of the connecting plate 21 on the anti-operation side. In this case, one end of the connecting plate 21 is connected to the upper part of the fixed platen 2 with bolts (not shown) or the like, and the connecting plate 21 is fixed to the base frame 1 via the support member 22. Further, another support member 23 such as a fixing bolt may additionally be provided at the one end of the connecting plate 21 on the operation side to fix the connecting plate 21 to the base frame 1 via this support member. The connecting member 10 shown in FIG. 7 has a somewhat decreased function of preventing the tilt of the fixed platen 2 as compared with the connecting member 10 shown in FIG. 1 (first embodiment) that is fixed to the base frame 1 by the side plate portion 10b. Also, the connecting member 10 shown in FIG. 7 has no side plate portion 10b integral with the connecting plate 21 (upper plate portion 10a), so that it has no function of a cover for preventing the scattering of resin.

The invention claimed is:

1. An injection molding machine having a fixed platen fixed on a base frame and an injection apparatus which is disposed on said base frame so as to be opposed to said fixed platen to advance and retract a cylinder for supplying a molding material, wherein said injection molding machine comprises a connecting member one end of which is fixed to said fixed platen at a portion above a locating hole of the fixed platen, and the other end of which is fixed to said base frame at a portion on an anti-operation side on the injection apparatus side.

2. The injection molding machine according to claim 1, wherein an upper part of said connecting member which is fixed to said fixed platen is of a plate shape, and is arranged so as to cover said cylinder.

3. The injection molding machine according to claim 1, wherein said connecting member consists of an upper plate portion one end of which is fixed to said fixed platen and a side plate portion one end of which is fixed to said base frame, and said upper and side plate portions are arranged so as to cover the upside and one side of said cylinder.

4. The injection molding machine according to claim 1, wherein said injection molding machine further comprises a support member for connecting and supporting an upper part of said connecting member and a part of said base frame on the operation side on the injection apparatus side.

5. The injection molding machine according to claim 1, wherein said connecting member is fixed to said fixed platen or said base frame so as to be detachable.

6. The injection molding machine according to claim 4, wherein said support member is fixed to said connecting member or said base frame so as to be detachable.

7. The injection molding machine according to claim 3, wherein said upper and side plate portions are formed integrally, and a transparent cover is provided between an end portion of said upper plate portion on the side opposite to said side plate portion and said base frame, whereby both sides and upside of said cylinder are covered with said side plate portion, said cover, and said upper plate portion.

8. An injection molding machine having a fixed platen fixed on a base frame and an injection apparatus which is disposed on said base frame so as to be opposed to said fixed platen to advance and retract a cylinder for supplying a molding material, wherein said injection molding machine comprises:

a connecting plate which is arranged above said cylinder, and one end portion of which is fixed to said fixed platen at a portion above a locating hole; and one or more rod-shaped support members for fixedly connecting the other end portion of said connecting plate to said base frame.

9. The injection molding machine according to claim 8, wherein said support members are provided on the base frame on the operation side and on the anti-operation side of the injection molding machine.

10. The injection molding machine according to claim 8, wherein said connecting member is fixed to said fixed platen or said base frame so as to be detachable.

11. The injection molding machine according to claim 9, wherein said support member is fixed to said connecting member or said base frame so as to be detachable.

* * * * *